United States Patent [19]

Sebesta et al.

[11] 4,006,318
[45] Feb. 1, 1977

[54] INERTIAL MICROPHONE SYSTEM

[75] Inventors: George J. Sebesta, Huntington Bay; Alan Hofer, Wantagh; Richard W. Carlisle, Elmsford, all of N.Y.

[73] Assignee: Dyna Magnetic Devices, Inc., Hicksville, N.Y.

[22] Filed: Apr. 21, 1975

[21] Appl. No.: 569,996

[52] U.S. Cl. .................... 179/121 C; 179/182 R
[51] Int. Cl.² ................ H04M 1/05; H04R 1/10
[58] Field of Search ........ 179/121 C, 156 R, 121 I, 179/107 BC, 182 R

[56] References Cited

UNITED STATES PATENTS 3,134,861  5/1964  Dempsey et al. ............. 179/156 R
3,787,641  1/1974  Santori ..................... 179/156 R X Primary Examiner—William C. Cooper
Attorney, Agent, or Firm—Lionel M. Rodgers

[57] ABSTRACT

An inertial-reaction microphone transducer mounting supported on the wearer's head away from the mouth for transmitting speech to the exclusion of ambient. A compliant, radial array of elastomer supporting material presses the transducer gently to the head. The transducer and supporting array may be mounted in a cup covering one ear, or it may be mounted in a capsule having an acoustical labyrinth frequency-selective vent for the neutralization of noise.

6 Claims, 9 Drawing Figures

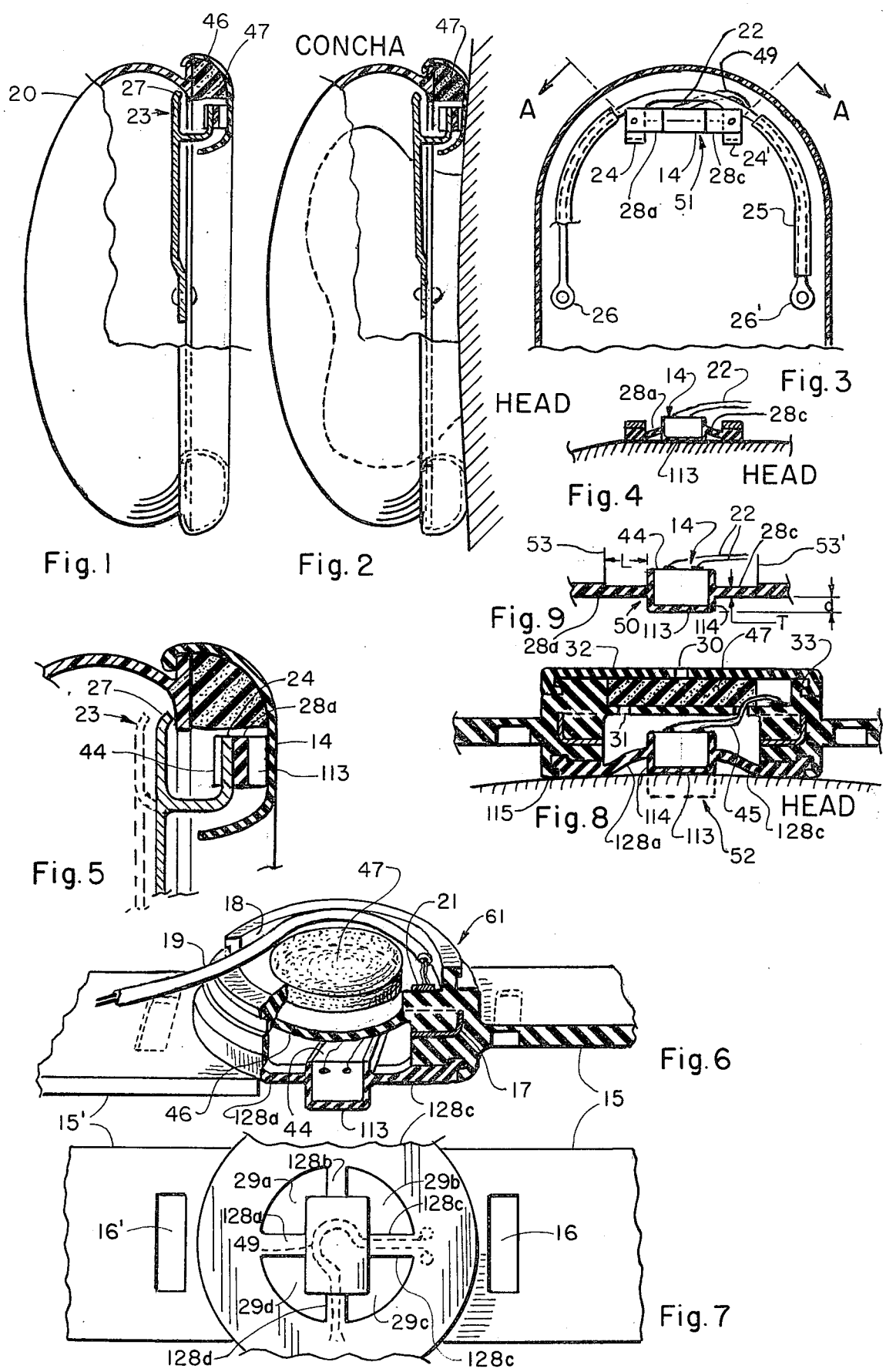

INERTIAL MICROPHONE SYSTEM

BACKGROUND AND SUMMARY OF THE INVENTION

This invention relates to inertial-reaction microphones and specifically to inertial transducer and mounting combinations having high articulation and good noise suppression properties. In mobile and motion-associated situations or where complete concealment of the communication equipment is required, a microphone cannot be disposed in front of the mouth; and the suppression of ambient noise is often essential. This microphone system is adapted to be mounted in any one of several positions remote from the mouth and it suppresses ambient noise.

This invention is related to U.S. Pat. No. 3,723,670, which also describes an inertial transducer mounting, assigned to the same assignee hereof. That mounting utilizes elastomer material having less favorable handling properties than the elastomer utilized in this invention. Reference is also made to French patent No. 1,249,517 as to the general subject matter. The inertial transducer utilized in this invention may be constructed as described in U.S. Pat. No. 3,733,445, assigned to the same assignee hereof.

It is an object of this invention to provide a head-coupled microphone system having acoustical, vibration-transmitting and vibration-isolating features by which optimum sensitivity to speech and maximum suppression of ambient noise is achieved.

It is another object to provide a supporting system for a microphone transducer in which radially disposed elastomer members press the transducer gently against the head while providing free access for ambient acoustically-transmitted noise to both the front and rear faces of the transducer.

It is another object to so proportion the elastomer members that mechanically-transmitted noise vibrations are isolated from the transducer.

It is another object to provide means for mounting the elastomeric system in a cup which concomitantly protects the ear from high-level sounds.

It is another object to mount the elastomeric system in a sound-insulating capsule having frequency selective acoustical venting means for neutralizing unwanted external and head-borne vibrations.

BRIEF DESCRIPTION OF THE DRAWING

FIG. 1 is a side elevation of one embodiment of the invention in which a transducer is mounted within a noise-excluding cup which is adapted to be worn over one ear; the cup and transducer are shown spaced away from the head; and the upper portion is shown cut away to show a supporting bracket.

FIG. 2 is a side elevation of the structure of FIG. 1 with the assembly impressed upon the head over the ear; the upper portion is shown cut away to show the supporting bracket.

FIG. 3 is a face elevation of the structure of FIG. 1 with the front cut away to show the mounting bracket, elastomer supporting members and transducer.

FIG. 4 is a section thru the line A—A of FIG. 3, showing the elastomer supporting members deflected by the force of impressing the assembly against the head.

FIG. 5 is an enlarged view of a portion of FIG. 1 showing the bracket and transducer in a position spaced away from the head.

FIG. 6 is a cut away perspective view of another embodiment of the invention, showing an elastomer capsule having its cover removed, a transducer and elastomer supporting members disposed in a position spaced away from the head, an elastomer foam pad as part of an acoustical vent system, and straps for external mounting.

FIG. 7 is a plan view of the lower face of the structure of FIG. 6 showing four elongated elastomer supporting members, electrical connection leads, and straps.

FIG. 8 is a longitudinal cross-section of the assembly of FIG. 6 complete with cover, acoustical vent system, transducer and elastomer supporting members shown deflected by the force of impressing the assembly against the head.

FIG. 9 is the basic element of the case showing an enlarged longitudinal cross-section of the transducer and elastomer supporting members disposed in a position spaced away from the head, adapted for mounting by the outer portions of the supporting members with or without either of the acoustical enclosures illustrated.

DETAILED DESCRIPTION OF THE INVENTION

The microphone transducer mounting system 50 as shown simplified in the cross-section of FIG. 9 comprises a plurality of radially-disposed, elongated elastomer members 28a, 28c affixed at their inner ends to the inertial-reaction microphone transducer 14. In the particular embodiment illustrated, the transducer is retained in the cup member 114 which is molded integrally with the elastomer members 28a–28c. The members 28a, 28c ends are indicated at 53, 53'. The preferred elastomer is Neoprene Duro 60. Illustrative proportions for the radial members are as follows: length L one-eighth inch, thickness T 0.038 inch and width (not shown) 0.075 inch. The output leads 22 (and also 45 in the embodiment of FIGS. 6, 7 and 8) are fine and in the various embodiments have loops 49 therein. They are thus highly compliant and constitute a mechanical filter to attenuate the transmission of external noise vibrations to the transducer 14. The outer ends of the elastomer members 28a, 28c are affixed in any one of several embodiments to support members which will be described with reference to the respective embodiments.

When this invention is utilized to transmit speech by impressing the face 113 of the transducer 14 against the head, speech is transmitted clearly without appreciable distortion from ambient noise with ambient noise levels up to approximately 85 Db, which is better than with a microphone held a few inches from the mouth.

In the embodiment illustrated in FIGS. 1–5, the elastomer support members 28a, 28c are affixed to bracket tips 24, 24' by rivets or any well known means. The bracket 23 has lateral arms 26, 26' which are affixed to inner portions of the cup 20. In the particular embodiment illustrated, the arms 26, 26' are copper wire 0.080 diameter. Elastomer covering 25 is used thereon for the purpose of dampening any vibrations which may occur therein.

The cup 20 is proportioned to fit over an ear for excluding unwanted sound. It is sealed to the head by an elastomer skin 46 and foam or equivalent cushion material 47. The assembly of transducer 14, elastomer members 28a–28c and bracket 23 is disposed in spaced relationship to cushion 47 and covered by skin 46 or cup 114 or the like. The outward movement of the bracket 23 beyond that required to juxtapose the bracket tips 24, 24' to the head is limited by impingement of bracket portion 27 upon the inside surface of the cup.

In laboratory tests made using the system described, "pink noise" sound was generated having uniform power per octave from below 60 Hz to above 12 KHz, in progressive steps. Speech was transmitted clearly without deterioration from this noise to above 120 Db, at which level the noise became "irritating" to the face as well as the ears. Between 120 Db and 125 Db, speech remained intelligible over the noise transmitted by the microphone in spite of physical discomfort caused by the noise, such as vibrations of many portions of the body.

In the embodiment illustrated in FIGS. 6, 7 and 8 the elastomer members 128a, 128b, 128c and 128d are interlaced with areas of low acoustical impedance 29a, 29b, 29c and 29d. In the embodiment illustrated in FIG. 7, these are open spaces. In some cases, an imperforate elastomer film or the like may be used over these areas.

It has been found that these areas of low acoustical impedance, which provide free access for ambient acoustically-transmitted noise to the rear face 44 of the transducer 14, have the effect of neutralizing said noise. This occurs since the transducer is responsive to the difference between the vibrations impinged upon the front and rear faces. The members 128a14 128d are shown integrally molded with a cup 114 which in one embodiment is disposed to protrude forward of the plane of the members 0.097 inch. This may be varied either way approximately 50%. This protrusion ensures contact with controlled force of the transducer surround 113 with the surface of the head regardless of the position of the transducer. In this example the compliance is evaluated by noting the force required to traverse the outer face 113 of the transducer 14 to a plane parallel to that of the surround 115; in this example this force is 10 ounces. The compliance in centimeter units is calculated as follows: $0.097 \times 2.54 / 10 \times 28.4 \times 980$ equals $0.9 \times 10^{-6}$ cm/dyne. The impedance of this member is such that mechanical filter action occurs in the low frequency range to prevent noise vibrations from propagating from the surround 113 to the transducer 14.

Ambient noise on the front face 113 and the rear face 44 is reduced by the acoustical enclosure over the transducer and elastomer members formed by the capsule 61. It has been found that noise picked up by the transducer is greatly reduced by venting the capsule thru an acoustical barrier comprised of the relatively stiff inner partition 46, in which several apertures 31 are provided; the outer cover 32, in which at least one aperture 30 is provided; and an acoustical labyrinth interposed therebetween, which in the preferred embodiment is a pad of elastomer foam such as urethane foam. It is believed that low frequencies are propagated thru this vent, to the exclusion of high frequencies, and that this has the effect of neutralizing mechanical vibrations impinging on the head and transmitted thru the head to the transducer.

In laboratory tests made using the system described, "pink noise" sound was generated having uniform power per octave from approximately 160 Hz to 6 KHz, in progressive steps. Speech was transmitted clearly without deterioration from this noise to above 115 Db, almost as good as transmission from the embodiment utilizing an ear-covering cup 20, in spite of the reduced size of the capsule 61. With the foam pad removed and a simple aperture 30 used in the cover 32, the noise level had to be reduced 15 Db for equivalent speech transmission.

Mechanical refinements in the structure of the capsule 61 include a metal reinforcing ring 17, to stiffen it against crushing and non-circular deformation under the pull of the tongues 15, 15'. These tongues are used to pull the capsule 61 against the head in any desired position. Non-circular deformation is further minimized by cut-out regions 16, 16' which serve to distribute the pull of the tongues 15, 15' on the sides of the capsule 61.

We claim:

1. A microphone adapted to be worn in contact with the head of a wearer to pick up the speech of the wearer and to severely attenuate ambient sounds, consisting of an inertial reaction transducer, an acoustical enclosure, support means for said transducer, and an acoustical labyrinth, the support means for said transducer including relatively thin compliant suspension means made from rubber-like elastomer material, the support means including a protuberance normally extending outward from the plane of the suspension means but adapted to be deflected inwardly of the acoustical enclosure when said microphone is applied to the head of a wearer, said acoustical labyrinth constituting acoustical filter means for excluding at least high frequency ambient sound.

2. A microphone as set forth in claim 1 in which the compliance of the suspension means is such that a force in the range of between five and fifteen ounces will force the protuberance back to a flush relationship with the face of the surround.

3. A microphone as set forth in claim 1 in which the compliance of the suspension means is of the order of magnitude of $0.9 \times 10^{-6}$ cm/dyne.

4. A microphone as set forth in claim 1 in which the compliance of the suspension means is of such order of magnitude that a force of 10 ounces causes the protuberance to retract 3/32 inch.

5. A microphone as set forth in claim 1 further including acoustical filter means in the wall of the enclosure comprising an acoustical labyrinth having at least one acoustical-transmitting tube having a length greater than its diameter.

6. A microphone as set forth in claim 5 in which the acoustical labyrinth is comprised of a disc of foam elastomer retained between walls of rubber-like material each having apertures therein communicating with each other through the foam disc, whereby to transmit a controlled amount of low frequency ambient sound.

* * * * *